US009552825B2

(12) United States Patent
Venkatesha et al.

(10) Patent No.: US 9,552,825 B2
(45) Date of Patent: Jan. 24, 2017

(54) NOISE CANCELLATION FOR VOICE ACTIVATION (71) Applicant: Honeywell International Inc., Morristown, NJ (US)

(72) Inventors: Sharath Venkatesha, Minnetonka, MN (US); Hai D. Pham, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 879 days.

(21) Appl. No.: 13/864,950

(22) Filed: Apr. 17, 2013

(65) Prior Publication Data
US 2014/0316778 A1    Oct. 23, 2014

(51) Int. Cl.
G10L 21/02      (2013.01)
G10L 21/0208    (2013.01)
G10L 15/22      (2006.01)

(52) U.S. Cl.
CPC ....... G10L 21/0202 (2013.01); G10L 21/0208 (2013.01); G10L 15/22 (2013.01)

(58) Field of Classification Search
CPC .............................. G10L 15/22; G10L 21/0208
See application file for complete search history.

(56) References Cited

U.S. PATENT DOCUMENTS

| 4,025,721 A * | 5/1977 | Graupe | G10L 21/0208 381/317 |
| 5,550,924 A * | 8/1996 | Helf | G10L 21/0208 381/94.3 |
| 5,684,924 A * | 11/1997 | Stanley | G10L 15/26 704/233 |
| 5,727,072 A * | 3/1998 | Raman | G10L 21/0208 381/94.2 |
| 5,960,397 A * | 9/1999 | Rahim | G10L 15/20 704/233 |

(Continued)

FOREIGN PATENT DOCUMENTS

EP    1918910    5/2008

OTHER PUBLICATIONS

Nattanun Thatphithakkul, et al. "Robust Speech Recognition Using KPCA-Based Noise Classification." ECTI Transactions on Computer and Information Technology, May 1, 2006, pp. 45-53, XP055133239, Retrieved from the Internet: URL:htp://www.ecti-thailand.org/assets/papers/103_pub_4.pdf.

(Continued)

Primary Examiner — Eric Yen
(74) Attorney, Agent, or Firm — Brooks, Cameron & Huebsch, PLLC (57) ABSTRACT Devices, methods, and systems for noise cancellation for voice activation are described herein. For example, one or more embodiments include determining, with a computing device, whether a background noise received with the computing device is recognized, creating a stored noise cancellation filter based on the background noise when the background noise is not recognized, receiving a signal that includes the background noise and a voice command at the computing device, filtering out the background noise from the signal with the stored noise cancellation filter, and processing the voice command.

18 Claims, 4 Drawing Sheets (56) References Cited

U.S. PATENT DOCUMENTS

| | | | | |
|---|---|---|---|---|
| 6,097,820 | A * | 8/2000 | Turner | G10L 21/0208 381/94.2 |
| 6,438,524 | B1 * | 8/2002 | Shi | G06F 17/2827 704/275 |
| 7,117,145 | B1 * | 10/2006 | Venkatesh | G10L 21/0208 704/200 |
| 8,041,026 | B1 * | 10/2011 | Coughlan | G10L 21/0208 379/392.01 |
| 8,700,392 | B1 * | 4/2014 | Hart | G10L 15/25 704/231 |
| 8,850,305 | B1 * | 9/2014 | Kent | G06F 17/30867 382/181 |
| 2002/0055840 | A1 * | 5/2002 | Yamada | G10L 15/063 704/245 |
| 2002/0138265 | A1 * | 9/2002 | Stevens | G10L 15/22 704/251 |
| 2003/0135371 | A1 * | 7/2003 | Chang | G10L 15/22 704/250 |
| 2003/0191636 | A1 * | 10/2003 | Zhou | G10L 15/065 704/226 |
| 2006/0259294 | A1 * | 11/2006 | Tashereau | G10L 15/02 704/10 |
| 2006/0265223 | A1 * | 11/2006 | Doyle | G10L 15/20 704/240 |
| 2007/0055508 | A1 * | 3/2007 | Zhao | G10L 21/0216 704/226 |
| 2007/0225984 | A1 * | 9/2007 | Milstein | G10L 21/02 704/270 |
| 2008/0162120 | A1 * | 7/2008 | MacTavish | G10L 21/06 704/201 |
| 2008/0195382 | A1 * | 8/2008 | Krini | G10L 19/0204 704/203 |
| 2008/0255827 | A1 * | 10/2008 | Nurminen | G10L 15/04 704/201 |
| 2008/0305815 | A1 * | 12/2008 | McDonough | H04L 12/5895 455/466 |
| 2009/0076636 | A1 * | 3/2009 | Bradford | G10L 21/02 700/94 |
| 2011/0029308 | A1 * | 2/2011 | Konchitsky | G10L 25/78 704/233 |
| 2011/0145000 | A1 * | 6/2011 | Hoepken | G10L 15/22 704/275 |
| 2012/0002820 | A1 | 1/2012 | Leichter | |
| 2013/0226586 | A1 * | 8/2013 | Jang | H04K 1/02 704/273 |
| 2013/0262106 | A1 * | 10/2013 | Hurvitz | G10L 15/183 704/235 |

OTHER PUBLICATIONS

Hong Lu, et al. "SoundSense: Scalable Sound Sensing for People-Centric Applications on Mobile Phones", Jun. 25, 2009, XP055026258, Retrieved from the Internet: URL:http://cvrr.ucsd.edu/ece285/papers/Lu_soundsense.pdf.

EP Search Report related to EP Application 14163283.6 dated Aug. 18, 2014 (5 pages).

Extended Search Report from related European Application 16175425.4. (8 pgs.).

* cited by examiner

NOISE CANCELLATION FOR VOICE ACTIVATION

TECHNICAL FIELD

The present disclosure relates to noise cancellation for voice activation.

BACKGROUND

A voice activated device can be used in a home and/or work environment, for example. In an example, voice activation can allow a user to operate the device using voice commands without having to touch the device. Voice activation can have applications in thermostats, home appliances, equipment for firefighting, hospital equipment, elevators, and/or in other industrial environments, for example. For instance, voice activation can allow for operation of the device without spreading of germs, without having to set down tools and/or equipment, and/or without having to visually see a user interface.

DETAILED DESCRIPTION

As discussed herein, a voice activated device can be used in a home and/or work environment, in an example. However, performance of these systems can be in question. In an example, performance of the voice activated device can be hindered as a result of the voice activated device failing to recognize a voice command, which can cause user frustration or place the user in danger, depending on where the voice activated device is used.

In an example, the presence of background noise can be one reason that the performance of a voice activated device can be hindered. For instance, the voice activated device can function by using a voice recognition engine that can decipher a voice command (e.g., user voice) and convert the voice command into a computing device command, which can then be executed by the device. In an example, the voice command can be masked by background noise generated in an environment in which the voice activated device is located.

For instance, if the voice activated device is located in a work environment, background noise generated by equipment located in the environment can mask the voice command, which can cause a failure in the voice activated device recognizing the voice command. Alternatively, and/or in addition, if the voice activated device is located in a home environment, background noise generated by appliances can mask the voice command, which can cause a failure in the voice activated device recognizing the voice command, for example.

To help address the limitations associated with voice activated devices, systems, methods, and machine-readable and executable instructions are provided for noise cancellation for voice activation. Noise cancellation can include determining, with a computing device, whether a background noise received with the computing device is recognized. Noise cancellation can include creating a stored noise cancellation filter based on the background noise when the background noise is not recognized. Noise cancellation can include receiving, the background noise and a voice command at the computing device. Noise cancellation can include filtering out the background noise with the stored noise cancellation filer. Noise cancellation can include processing the voice command.

In the following detailed description of the present disclosure, reference is made to the accompanying drawings that form a part hereof, and in which is shown by way of illustration how one or more in embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. As used herein, "a" or "a number of" refers to one or more. In addition, as will be appreciated, the proportion and the relative scale of the elements provided in the figures are intended to illustrate the embodiments of the present invention, and should not be taken in a limiting sense.

Figure 1:
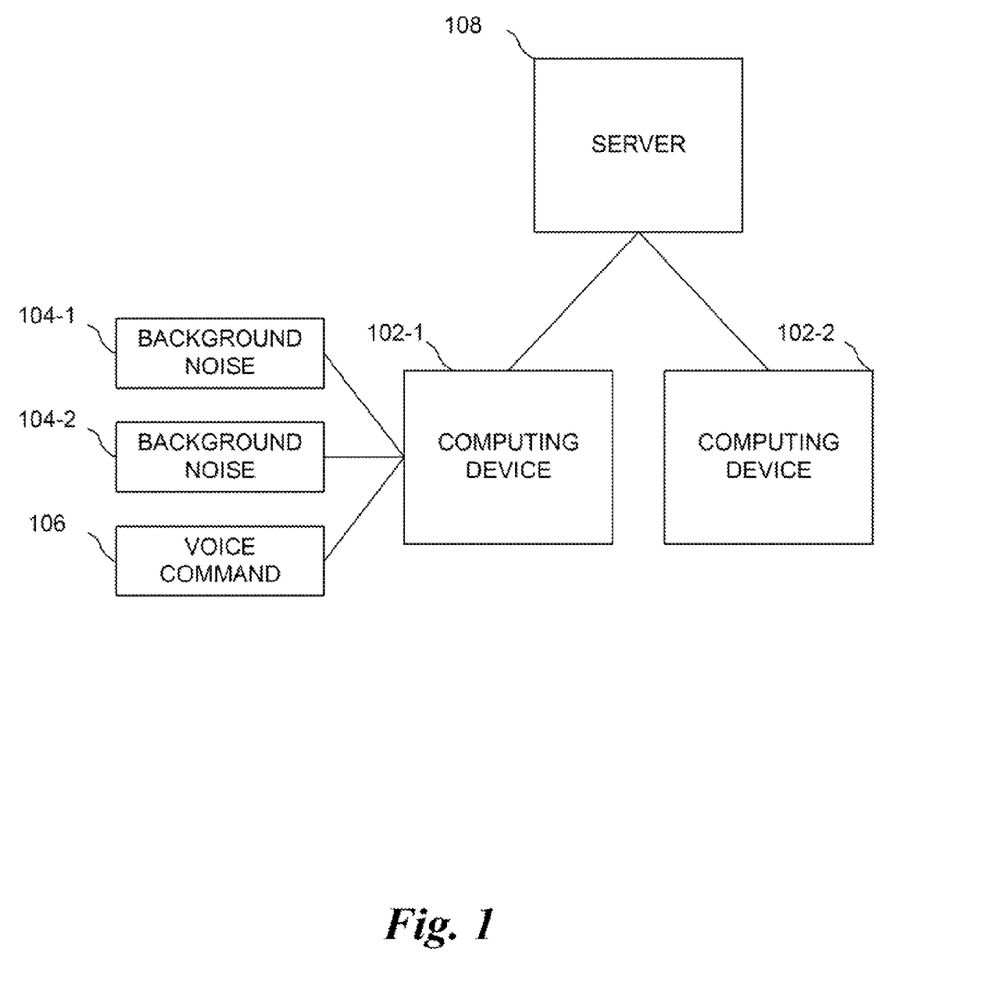
FIG. 1 illustrates a system for noise cancellation for voice activation according to one or more embodiments of the present disclosure.

FIG. 1 illustrates a system for noise cancellation for voice activation according to one or more embodiments of the present disclosure. In an example, the system can include a first computing device 102-1. The first computing device 102-1 can be a voice activated computing device, in an example. For example, the first computing device 102-1 can be associated with a thermostat, a home appliance, equipment for firefighting, hospital equipment, elevators, and/or other devices located in the home and/or work environment, although examples are not so limited.

In an example, the first computing device 102-1 can receive a voice command 104-3. For instance, the first computing device 102-1 can include a voice recognition engine that can decipher the voice command 106 and convert the voice command 106 into a computing device command, which can instruct the first computing device 102-1 to perform a function. For example, where the first computing device 102-1 is associated with a thermostat, the computing device command can include an instruction to adjust a temperature controlled by the thermostat.

The first computing device 102-1 can be located in an environment that can be a home and/or work environment, in an example. For instance, the environment associated with the first computing device 102-1 can be proximate to the first computing device 102-1. As such, in addition to a voice command 106 being received by the first computing device 102-1 the first computing device 102-1 can also receive a first background noise 104-1.

For example, if the first computing device 102-1 is located in a home environment, the first background noise 104-1 can include a noise associated with an appliance such as a dish washer, ventilation system, vacuum cleaner, etc. If the first computing device 102-1 is located in a work environment, the first background noise 104-1 can include a noise associated with a piece of equipment such as a printing press, a power tool, ventilation system, etc.

In an example, the first background noise 104-1 can mask the voice command 106. For instance, the first background noise 104-1 can interfere with a signal associated with the voice command 106, which can create a corrupted input signal that is received by the first computing device 102-1. As a result, the signal associated with the voice command 106 may not be recognized by the voice recognition engine in the computing device 102-1 and therefore may not be converted into the computing device command.

Some embodiments of the present disclosure can filter out the first background noise 102-1, which can result in the voice recognition engine being able to recognize the voice command 106 and convert the voice command 106 into the computing device command. In some embodiments, the computing device 102-1 can store noise cancellation filters that are created based on background noises received by the first computing device 102-1. When the first computing device 102-1 receives a background noise and a voice command, the first computing device 102-1 can filter out the background noise with the stored noise cancellation filer, leaving the voice command to be processed by the voice recognition engine.

In some embodiments, the first computing device 102-1 can operate in a training mode. In the training mode, the first computing device 102-1 can be trained to recognize background noises. The recognition can include analysis of the frequency, amplitude, and/or other signal characteristics such as pulse width and/or pulse repetitive frequency, etc. of the noise signals associated with the background noise. The noise signals in home and/or office environments can be non-random (e.g., can be repetitive) and can therefore aid in recognition of the noise signals. Noise cancellation filters can be created based on these noise signals, which can be stored on the computing device and can later be used to filter out the background noises from a signal that includes a background noise and a voice command.

In an example, the first computing device 102-1 can determine whether the first background noise 104-1 received by the first computing device 102-1 is recognized. In an example, if the first background noise 104-1 is not recognized by the first computing device 102-1, a first stored noise cancellation filter can be created based on the first background noise 104-1. The first stored noise cancellation filter can include identification characteristics of the first background noise 104-1. For instance, the identification characteristics can include a frequency associated with the first background noise 104-1 and/or an amplitude associated with the first background noise 104-1, pulse width, and/or repetitive frequency, although examples are not so limited.

In an example, the first stored noise cancellation filter can have a weight associated with it. The weight associated with the first stored noise cancellation filter can be determined based on how closely the filter is correlated to the input noise signal. The calculation of weights can be based on the analysis of the frequency, amplitude, and/or other signal characteristics such as pulse width and/or pulse repetitive frequency, etc. of the noise signals associated with the background noise.

In an example, if the first computing device 102-1 is located in a work environment, the first background noise 104-1 received by the first computing device 102-1 can be associated with a power tool. The noise associated with the power tool can include a particular frequency and/or amplitude, which can distinguish the noise from other noises generated in the work environment. If noise cancellation filters have been stored on the first computing device 102-1 previously, identification characteristics of the noise associated with the power tool can be compared to identification characteristics contained in each stored noise cancellation filter.

For instance, the frequency and/or amplitude of the noise associated with the power tool can be compared to the frequency and/or amplitude associated with each stored noise cancellation filter. If a match and/or correlation does not exist between the identification characteristics associated with the power tool and the identification characteristics associated with one of the stored noise cancellation fiilter a determination that the noise associated with the power tool is not recognized can be made and a first stored noise cancellation filter can be created that includes the identification characteristics associated with the power tool.

Alternatively, and/or in addition, if a match and/or correlation does exist between the identification characteristics associated with the power tool and the identification characteristics associated with one of the stored noise cancellation filters, a determination that the noise associated with the power tool is recognized can be made. As such, a need for storing an additional noise cancellation filter may not exist.

Alternatively, and/or in addition, if noise cancellation filters have not been stored on the first computing device 102-1 previously, there may be no stored noise cancellation filters to compare with the identification characteristics of the power tool. As such, a determination that the noise associated with the power tool is not recognized can be made and a first stored noise cancellation filter can be created that includes the identification characteristics associated with the power tool. As such, the first computing device 102-1 can be trained to recognize background noises, which can be stored on the computing device and can later be used to filter out the background noise from the signal that includes the background noise and the voice command.

In an example, in the training mode, the first computing device 102-1 can be trained to recognize a user's voice. The user's voice can be learned to differentiate the user's voice from the background noise, in an example, so the user's voice is not filtered out by a noise cancellation filter. In an example, the recognition can include analysis of the frequency, amplitude, and/or other signal characteristics such as pulse width and/or pulse repetitive frequency, etc. of the user's voice.

In some embodiments, the first computing device 102-1 can operate in an operation mode. For instance, when the first computing device 102-1 operates in the operation mode, the first computing device 102-1 can filter out the background noise from the signal that includes background noise and the voice command using the noise cancellation filters that have been learned in the training mode.

In an example, some embodiments can include receiving a second background noise 104-2 and the voice command 106 at the first computing device 102-1. In an example, as a user speaks the voice command 106, the second background noise 104-2 can be generated simultaneously and both the voice command 106 and the second background noise 104-2 can be received by the first computing device 102-1.

As such, the second background noise 104-2 can interfere with the signal associated with the voice command 106, which can create a corrupted input signal that is received by the first computing device 102-1. As discussed herein, the signal associated with the voice command 106 may not be recognized by the voice recognition engine in the computing device 102-1 and therefore may not be converted into the computing device command.

In an example, the first computing device 102-1 can process the second background noise 104-2 and the voice command 106 at the first computing device 102-1 with a voice recognition engine. Upon processing the second background noise 104-2 and the voice command 106, a confidence level associated with a processed signal that includes the second background noise 104-2 and the voice command 106 can be determined.

In an example, the confidence level associated with the processed signal can be determined based on criteria that include mean square error and/or temporal average of the least squares error, although examples are not so limited. In an example, different algorithms can be used for each criteria, which can include the least mean squares algorithm and/or the recursive least squares algorithm, although examples are not so limited.

In some embodiments, if the confidence level does not meet a threshold, an indication can be made that the voice recognition engine may not be able to convert the voice command 106 into the computing device command. As such, the first stored noise cancellation filter can be applied to the signal to filter out the second background noise 104-2 when the processed signal does not meet the confidence level. Upon filtering out the second background noise 104-2 from the signal with the first stored noise cancellation filter, the voice command can be processed with the voice recognition engine.

In an example, if the second background noise 104-2 cannot be filtered from the signal with the first stored noise cancellation filter, an alternate stored noise cancellation filter can be applied to filter out the second background noise 104-2. Alternatively, and/or in addition, a plurality of stored noise cancellation filters can be used to filter out the second background noise 104-2.

For instance, multiple sets of filters can be used in a weighted combination to filter out the second background noise 104-2. In an example, multiple stored noise cancellation filters with different filter weights can be combined, which can behave as an adaptive filter, which can be capable of adjusting to a background noise to filter it out. In an example, each of the multiple stored noise cancellation filters can be associated with a weight. In an example, the sum of all weights used for combination of multiple stored noise cancellation filters can be equal to a unit weight.

As such, stored noise cancellation filters can be added and/or subtracted to adjust the weight of a filter that can be applied to filter out the second background noise 104-2. In an example, multiple stored noise cancellation filters can be applied as an adaptive filter, which can be a filter that is applied to filter out the second background noise 104-2 and can have a variable weight, depending on whether stored noise cancellation filters with their own respective weights are added or subtracted from the adaptive filter.

In an example, upon processing the voice command with the voice recognition engine, a second confidence level associated with the processed signal that includes the filtered voice command can be determined. For instance, the second confidence level can be determined and a determination can be made whether the processed signal that includes the filtered voice command meets the confidence level can be made. In an example, the voice command can be reprocessed with a different noise cancellation filter until the processed voice command meets the confidence level.

In some embodiments, the first computing device 102-1 can include a plurality of stored noise cancellation filters as a result of a plurality of background noises that can be generated in the environment in which the first computing device 102-1 is located. As such, the first computing device 102-1 can select one of the plurality of stored noise cancellation filters to apply to the signal to filter out a particular background noise from the signal.

For instance, each of the plurality of stored noise cancellation filters can be, applied to the signal sequentially and/or in parallel and can be processed by the voice recognition engine and a confidence level can be determined for each noise cancellation filter or in combination upon the application of each of the plurality of stored noise cancellation filters. In an example, each of the plurality of stored noise cancellation filters can be applied to the signal until a determination is made that the processed signal meets the confidence level.

In some embodiments, the confidence level can be used to modify the weights used for a set of stored noise cancellation filters. The weights can be modified so as to obtain a higher confidence level in a given time. For example, the confidence level associated with the processed signal can be increased over a defined period of time by modifying the weights used for the set of stored noise cancellation filters. Alternatively, and/or in addition, the confidence level associated with the processed signal can be increased such that the confidence level can be increased to a value that can be higher than a given threshold.

Alternatively, and/or in addition, a correlation can be made between each of the plurality of stored noise cancellation filters and the signal that is input into the voice recognition engine that includes the background noise and the voice command. For instance, if a correlation between one of the plurality of stored noise cancellation filters and the signal that is input into the voice recognition engine can be made, that particular noise cancellation filter or a combination of noise cancellation filters can be applied to the signal that is input into the voice recognition engine.

For example, a correlation coefficient can be calculated between each of the plurality of stored noise cancellation filters and the signal that is input into the voice recognition engine. Full correlation between a stored noise cancellation filter and the signal that is input into the voice recognition engine can be expressed with a correlation coefficient of 1. In an example where no correlation exists between a stored noise cancellation filer and the signal that is input into the voice recognition engine, the correlation coefficient can be 0.

In an example, the correlation coefficient between each of the plurality of stored noise cancellation filters and the signal that is input into the voice recognition engine can be between 0 and 1. The selection of one or more stored noise cancellation filters to be applied can be based on the correlation coefficient. For instance, if a correlation coefficient near 1 exists between the signal that is input into the voice recognition engine and one of the stored noise cancellation filters, that particular noise cancellation filter can be used for filtering out the background noise from the signal that is input into the voice recognition engine.

Alternatively, and/or in addition, if multiple stored noise cancellation filters generate correlation coefficients near 1, a combination of noise cancellation filters can be used for filtering out the background noise from the signal that is input into the voice recognition engine. As such, the background noise can be filtered out without having to sequentially apply each of the plurality of stored noise cancellation filters to the signal that is input into the voice recognition engine.

In some embodiments, the system can include a second computing device 102-2 that includes those features discussed with respect to the first computing device 102-1. In an example, the second computing device 102-2 can be in a different environment than the first computing device 102-1. However, the second computing device 102-2 can be in communication with the first computing device 102-1 via a server 108. Alternatively, and/or in addition, the second computing device 102-2 can be in communication with the first computing device 102-1 directly (e.g., without the server 108).

In some embodiments, the first computing device 102-1 can download a second stored noise cancellation filter from the second computing device 102-2 in response to a selection received by the first computing device 102-1. In an example, the second stored noise cancellation filer can be generated by the second computing device 102-2 in response to receiving, a background noise from an environment that is proximate to the second computing device 102-2. For instance, the second stored noise cancellation filter can be associated with the background noise from the environment that is proximate to the second computing device 102-2.

In some embodiments, the first computing device 102-1 can have an embedded processor in communication with the server 108. The server 108 can act as a cloud, utilized for "cloud computing," which can be considered as the use of computing resources (e.g., hardware, software, logic, etc.) that can be delivered as a service over a communications network (e.g., in a wired and/or wireless manner over the Internet).

In an example, processing associated with noise cancellation for voice activation can be shifted from the first computing device 102-1 to the server 108. For instance, generating noise cancellation filters can be done on 102-1 whereas processing that can be computationally intensive, such as filter combination, selection of weights, performing voice recognition, etc. can be performed on the server 108, rather than the first computing device 102-1. In an example, this can be beneficial when the first computing device 102-1 does not possess processing resources needed for generating adaptive filters, performing voice recognition, etc.

In an example, the type of equipment and/or appliance that generates the background noise can be associated with the second stored noise cancellation filter. For instance, a type of dishwasher, ventilation system, vacuum cleaner, printing press, power tool etc. can be associated with the second stored noise cancellation filter.

In an example, the source of the background noise can be located in the environment that is proximate to the second computing device 102-2. For instance, the piece of equipment and/or appliance can be located in the environment that is proximate to the second computing device 102-2, which can be the source of the background noise. Alternatively, and/or in addition, a same piece of equipment and/or appliance can be located in the first environment proximate to the first computing device 102-1.

As such, the stored noise cancellation filter associated with the piece of equipment and/or appliance can be downloaded by the first computing device 102-1 from the second computing device 102-2. Downloading the stored noise cancellation filter associated with the piece of equipment and/or appliance to the first computing device 102-1 can be beneficial because this can allow the first computing device 102-1 to skip the training mode associated with the piece of equipment and/or appliance.

In some embodiments, the second stored noise cancellation filter can be downloaded via a server 108 in communication with the first computing device 102-1 and the second computing device 102-2. In an example, the server 108 can store noise cancellation filters, which can be downloaded by the first computing device 102-1 and/or the second computing device 102-2. In an example, as stored noise cancellation filters are created by the first computing device 102-1 and/or second computing device 102-2, they can be uploaded to the server 108 and stored.

Alternatively, and/or in addition, details associated with the stored noise cancellation filters can be uploaded to the server 108. For example, details associated with the environment in which the stored noise cancellation filter was created can be associated with the stored noise cancellation filter. For instance, if the stored noise cancellation filter was created in a home environment, a tag can be associated with the stored noise cancellation filter indicating this. As such, stored noise cancellation filers with common tags can be grouped together to form tool kits that can be downloaded by the first computing device 102-1 and/or the second computing device 102-2. For example, noise cancellation filters with common tags can be grouped together on the server 108.

Alternatively, and/or in addition, details associated with the particular piece of equipment and/or appliance associated with the background noise can be associated with the stored noise cancellation filter. For instance, a tag can be associated with the stored noise cancellation filter indicating the particular piece of equipment and/or appliance. As such, stored noise cancellation filters with common tags can be grouped together to form tool kits that can be downloaded by the first computing device 102-1 and/or the second computing device 102-2.

In an example, a user of the first computing device 102-1 and/or second computing device 102-2 can perform a search based on tags associated with the stored noise cancellation filters. For instance, if the user wishes to download stored noise cancellation filters from the server 108 for a home, the user can perform a search on a user interface in communication with the first computing device 102-1 and/or second computing device 102-2 by specifying that stored noise cancellation filters associated with a home environment (e.g., home tool kit) should be retrieved. The user can further download all stored noise cancellation filters associated with the home environment and/or individual stored noise cancellation filters associated with the home environment.

Alternatively, and/or in addition, the user can search for individual pieces of equipment and/or appliances. In an example, the user can search for individual pieces of equipment generally by completing a search query for a general category of equipment and/or appliance. For instance, the user can perform a search for a vacuum. Alternatively, and/or in addition, the user can perform a search for a particular piece of equipment and/or appliance. For instance, the user can perform a search for a particular model of vacuum. Upon completing the search, the stored noise cancellation filter associated with the search can be downloaded to the first computing device 102-1 and/or the second computing device 102-2.

Figure 2:
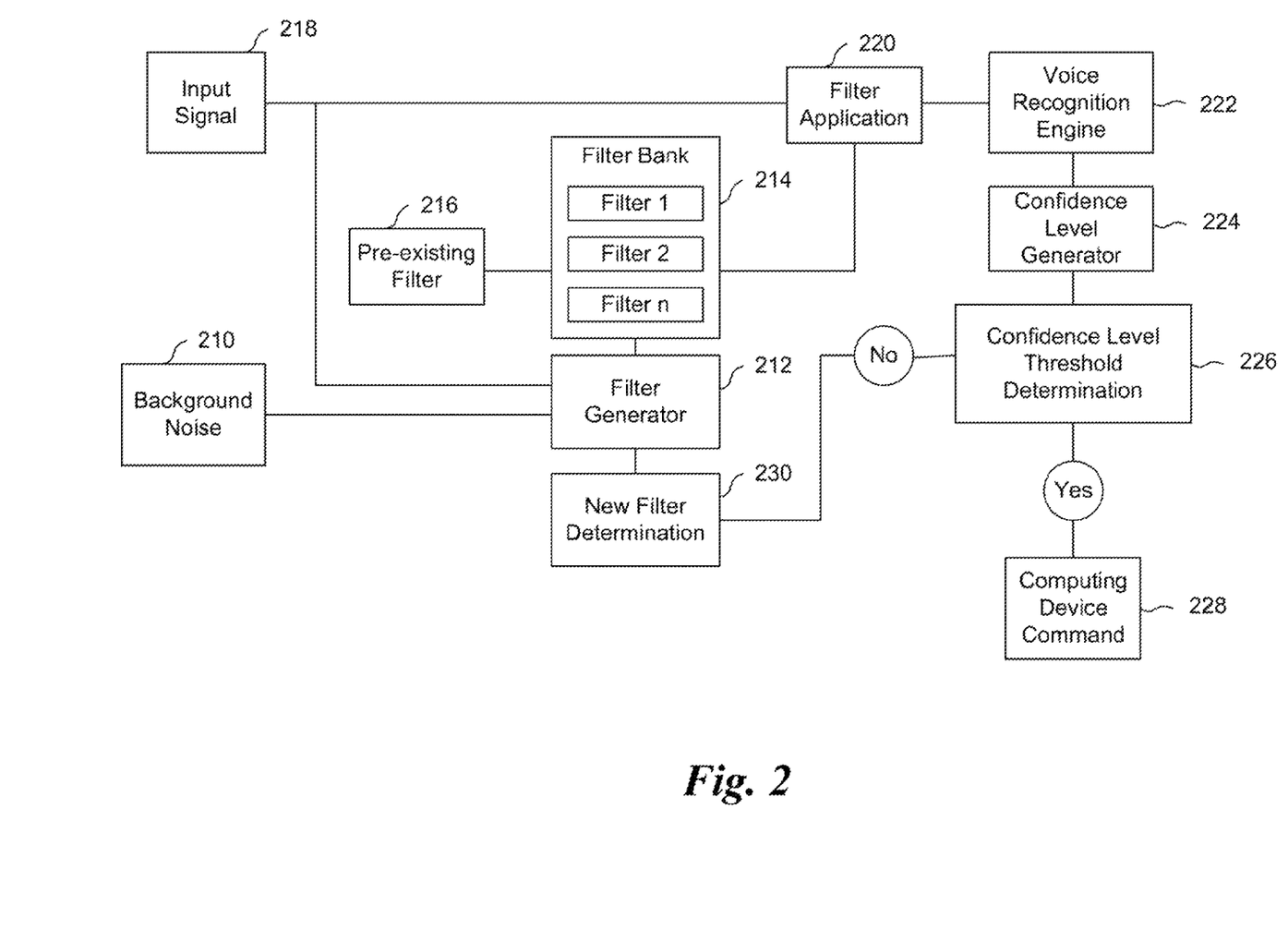
FIG. 2 illustrates a flow diagram for noise cancellation for voice activation according to one or more embodiments of the present disclosure.

FIG. 2 illustrates a flow diagram for noise cancellation for voice activation according to one or more embodiments of the present disclosure. In some embodiments, a training mode can include receiving a background noise 210 with a filter generator 212, as discussed herein. The filter generator can analyze the frequency, amplitude, and/or other signal characteristics such as pulse width and/or pulse repetitive frequency, etc. of the noise signals associated with the background noise. As such, a filter bank 214 can store noise cancellation filters (e.g., Filter 1, Filter 2, Filter n) that have been generated based on the noise signals analyzed by the filter generator 212. Alternatively, and/or in addition, pre-existing stored noise cancellation filters 216 based on the respective environment in use (e.g., home, office, etc.) can be received from the server and used to filter out the noise signals associated with the background noise 210.

In an example, each of the stored noise cancellation filters can have a weight associated with it. The weight associated with each stored noise cancellation filter can be determined based on how closely the filter is correlated to the input noise signal. The calculation of weights (e.g., $W_1, W_2 \ldots W_n$) can be based on the analysis of the frequency, amplitude, and/or other signal characteristics such as pulse width and/or pulse repetitive frequency, etc. of the noise signals associated with the background noise.

In some embodiments, an operation mode can include filtering out background noise from an input signal 218 that includes a background noise and a voice command. In an example, the input signal 218 can be received from an environment (e.g., home environment, work environment) where a background noise is generated in addition to the voice command generated by a user. For instance, the input signal can be represented as s+n, where s is a signal component of the voice command and n is a signal noise associated with the background noise.

In an example, a stored noise cancellation filter from the filter bank 214 can be applied at filter application 220 to the input signal 218 to filter out the background noise included in the input signal 218. In an example, signal noise associated with a stored noise cancellation filter, which can be represented as n̂ can be subtracted from the input signal, s+n, when the stored noise cancellation filter from the filter bank 214 is applied at filter application 220 (e.g., ((s+n)−n̂).

In some embodiments, the input signal that has had the stored noise cancellation filter applied can be processed by a voice recognition engine 222. Upon processing the input signal with the voice recognition engine 222, a processed signal can be generated and a confidence level associated with the processed signal can be generated by a confidence level generator 224.

In some embodiments, the confidence generator 224 can generate a confidence value based on the failure and/or success of the voice recognition engine. This value may be based on a number of parameters specific to the voice recognition engine. In an example, the confidence level can include a correlation coefficient, which can provide a degree of correlation between the stored noise cancellation filter that has been applied and the background noise contained in the input signal.

As discussed herein, a full correlation between them can result in a high degree of noise reduction and can imply a high confidence value. As such, based on the confidence value, a determination can be made whether the background noise has been sufficiently filtered from the input signal at confidence level threshold determination 226. In an example, the confidence level threshold determination 226 can determine whether the confidence level is within a defined range of a value. The threshold can be defined based on the environment of usage.

For example, the threshold can be defined based on a risk associated with a computing device command 228 being issued when the confidence level threshold is not met. For instance, if the environment is an industrial control plant, a risk associated with a device command being issued when the confidence level threshold is not met can be greater than if the environment is a home environment. As such, as risk associated with the environment increases, the threshold associated with the confidence level can increase. If the confidence level is higher than the threshold, a computing device command 228 can be issued to a computing device.

Alternatively, and/or in addition, if the confidence level is not within a defined range of a value, a determination can be made to apply a new filter at new filter determination 230. The new filter determination 230 can provide data to the filter generator 212 associated with how to change the type of filter to apply to the input signal 218.

In an example, the data can include an indication of whether to modify weights associated with one or more filters applied to the input signal 106. For instance, the confidence levels that have been calculated by the confidence level generator 224 can be used to increase the weight associated with a specific filter in a set of filters applied to the input signal 106 and/or decrease the weight associated with another filter in the same set of filters applied to the input signal 106.

In some embodiments, a very low confidence value can imply that a weighted linear combination of existing filters may not be sufficient to improve the quality of the input voice command. In such a case, a new noise cancellation filter can be added at 212 and applied to improve the quality of the input voice command. As such, the confidence level can again be calculated to determine whether the new noise cancellation filter has improved the quality of the input voice command.

In an example, multiple stored noise cancellation filters can be combined and applied as an adaptive filter to the input signal 106, as discussed herein. As such, stored noise cancellation filters with individual weights can be combined to create a filter that has a particular weight, which can be applied to the input signal 106 to filter out the background noise in the input signal 106.

In some embodiments, the input signal 218 can be received by the filter generator 212. In an example, the filter generator 212 can generate a new filter based on the background noise in the input signal 218 if a filter corresponding to the background noise does not exist. In some embodiments, the process of noise filtering, voice recognition, confidence level generation, and success and/or failure of the voice recognition engine can continue in a loop until a user specified time limit for command execution is reached or generation of a confidence value meeting the user requirements for command processing.

Figure 3:
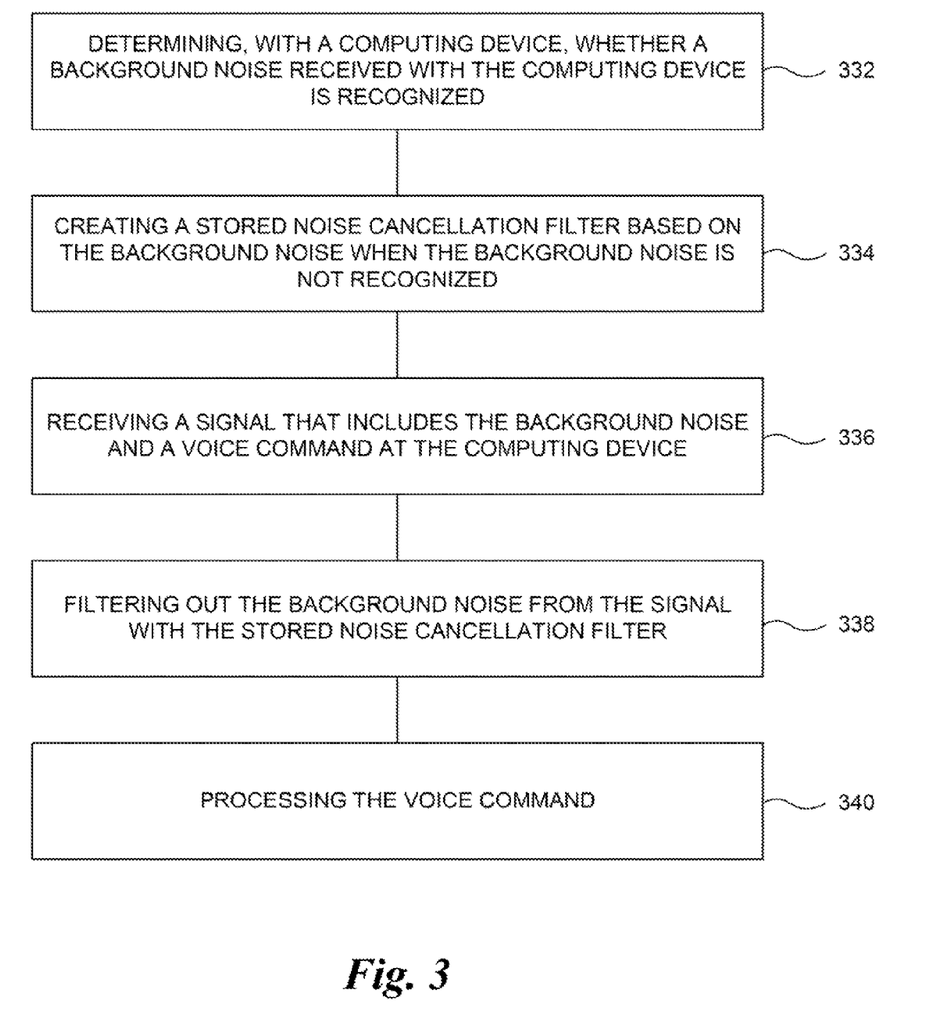
FIG. 3 illustrates a method for noise cancellation for voice activation according to one or more embodiments of the present disclosure.

FIG. 3 illustrates a method for noise cancellation for voice activation according to one or more embodiments of the present disclosure. In an example, the method can include determining, with a computing device, whether a background noise received with the computing device is recognized, at block 332. In an example, the computing device can receive the background noise from an environment that is proximate to the computing device. The environment can be a work environment and/or home environment, in an example. For instance, the background noise can be created from a piece of equipment and/or an appliance that is located in the work and/or home environment.

In an example, the computing device can store noise cancellation filters that are associated with background noise generated in the environment that is proximate to the computing device. For instance, the stored noise cancellation filters can include identification characteristics associated with the background noise. Identification characteristics can include a frequency associated with the first background noise and/or an amplitude associated with the background noise, although examples are not so limited.

At block 334, the method can include creating a stored noise cancellation filer based on the background noise when the background noise is not recognized. As discussed herein, the computing device can determine whether the background noise received by the computing device is recognized. In an example, if the background noise is not recognized by the computing device, a stored noise cancellation filter can be created based on the background noise.

In an example, determining whether the background noise is recognized can include determining whether a match and/or correlation exists between the background noise and the stored noise cancellation filter. For instance, identification characteristics that are included in the stored noise cancellation filter can be compared to the identification characteristics associated with the background noise. If a match and/or correlation is determined to not exist, a noise cancellation filter can be created and stored on the computing device.

The method can include, at block 336, receiving a signal that includes the background noise and a voice command at the computing device. In an example, as discussed herein, as a user speaks the voice command, the background noise can be generated simultaneously, which can interfere with the signal associated with the voice command. As a result, the computing device may not be able to process the voice command due to the interference caused by the background noise. As such, in some embodiments, the method can include filtering out the background noise.

The method can include filtering out the background noise from the signal with the stored noise cancellation filter, at block 338. In an example, as discussed herein, the background noise and the voice command can be processed at the computing device with a voice recognition engine. Upon processing the background noise and the voice command, a confidence level associated with the processed background noise and the voice command can be determined, and the stored noise cancellation filter can be applied to the background noise and the voice command to filter out the background noise when the processed signal does not meet a threshold confidence level.

In an example, additional stored noise cancellation filters can be applied to the background noise and the voice command to filter out the background noise until at least one of a defined time limit is exceeded and the processed signal meets the threshold confidence level. For instance, a defined time limit for applying additional stored noise cancellation filers and/or processing the background noise and the voice command can be set to control use of computing resources and/or prevent a backlog of background noise and/or voice commands waiting to be processed.

In an example, once the stored noise cancellation filter has been applied to the signal that includes the background noise and the voice command, the background noise can be filtered out and the method can include processing the voice command with the computing device, at block 340. After the voice command has been processed, a confidence level can be determined once again to ensure that the processed signal meets the confidence level.

If the processed signal does not meet the confidence level and/or is not within a threshold of the confidence level, a different stored noise cancellation filter can be applied to the processed signal and the process can repeat with the voice recognition engine until the confidence level is met. When the confidence level is met, voice recognition can be performed on the signal and the voice command can be turned into a computing device command, which can instruct the computing device to perform a function.

In some embodiments, a confidence level generator can generate a confidence level based on the failure and/or success of the voice recognition engine. In an example, the confidence level can be based on a correlation coefficient, which can provide a degree of correlation between the stored noise cancellation filter that has been applied and the background noise contained in the input signal. As discussed herein, a full correlation between the stored noise cancellation filter and the background noise contained in the input signal can result in a high degree of background noise reduction and can imply a high confidence level.

In some embodiments, the method can include receiving a pre-existing stored noise cancellation filter with the computing device. In an example, the pre-existing stored noise cancellation filter can be associated with a background noise. However, the pre-existing stored noise cancellation filter may be created by a second computing device. For instance, the second computing device may be located in an environment that is different than an environment in which the computing device is located. The second computing device can create the pre-existing stored noise cancellation filter and details can be associated with the pre-existing stored noise cancellation filter such as an identification of the piece of equipment and/or appliance that created the background noise, as discussed herein.

In some embodiments, upon receiving the pre-existing stored noise cancellation filter with the computing device, the computing device can filter out the background noise with the pre-existing stored noise cancellation filter. As such, the computing device may not be required to enter a training mode to create the pre-existing stored noise cancellation filter.

Alternatively, and/or in addition, the computing device can upload a stored noise cancellation filter created by the computing device directly to the second computing device and/or to a server for distribution of the stored noise cancellation filter to the second computing device. As such, the second computing device can filter out the background noise associated with the stored noise cancellation filter without having to create the stored noise cancellation filter in a training mode.

In an example, as discussed herein, the method can include grouping a plurality of noise cancellation filters stored an the server based on a type of environment in which they were created. For example, noise cancellation filters that were created in a home environment can be grouped together versus noise cancellation filters that were created in a work environment. In an example, the second computing device can download the grouped plurality of noise cancellation filters with the second computing device upon an installation of the second computing device. In an example, installation can include an initial configuration and/or mechanical installation of the computing device.

In some embodiments, the method can include sending the background noise to a second computing device and determining, with the second computing device whether a match and/or correlation exists between the background noise and one of the plurality of stored noise cancellation filers. Alternatively, and/or in addition, the method can include sending the voice command and the background noise to the second computing device for filtering out the background noise and processing the voice command. In an example, the method can include sending the voice command and the background noise to a cloud for filtering out the background noise and processing the voice command, as discussed herein.

In an example, where the computing device is a thermostat, sending the background noise and/or voice command to the second computing device can be beneficial because processing resources used by the thermostat for determining whether a match and/or correlation exists between the background noise and one of the plurality of stored noise cancellation filters and/or for processing the voice command can generate heat, which can affect the function of the thermostat. For instance, generation of heat can lead the thermostat to believe that an environment is warmer than it actually is and thus provide cooling to the environment.

In some embodiments, the method can include entering a sleep mode with the computing device upon a period of inactivity and receiving the background noise when the computing device is in the sleep mode. In an example, the sleep mode can be a mode that the computing device enters to save energy. For instance, functions that are non-essential to the function of the computing device can be turned off and/or adjusted to save energy. For instance, a user interface associated with the computing device can be turned off and/or a contrast and/or backlight associated with the interface can be reduced to save energy.

However, the computing device can continue to listen for background noise and/or a voice command in the sleep mode. As such, the computing device can create a stored noise cancellation filter based on the background noise when the background noise is not recognized when the computing device is in the sleep mode. For example, the computing device can enter a training mode when the computing device enters the sleep mode. In an example, the computing device can exit the sleep mode when the computing device receives a voice command and/or receives an input via the user interface.

In an example, the method can include applying a plurality of stored noise cancellation filters to the background noise and the voice command to filter out the background noise based on the correlation between the background noise and the plurality of stored noise cancellation filters. The plurality of stored noise cancellation filters can have an overall first weight. For example, each individual filter can have a weight, as discussed herein which can be summed to provide the overall first weight.

The method can include modifying the overall first weight associated with the plurality of stored noise cancellation filters if the determined confidence level does not meet the threshold confidence level. In an example, the overall first weight can be modified to an overall second weight. The plurality of stored noise cancellation filters with an overall second weight can then be applied to the background noise and the voice command to filter out the background noise in response to the confidence level not meeting the threshold confidence level.

Figure 4:
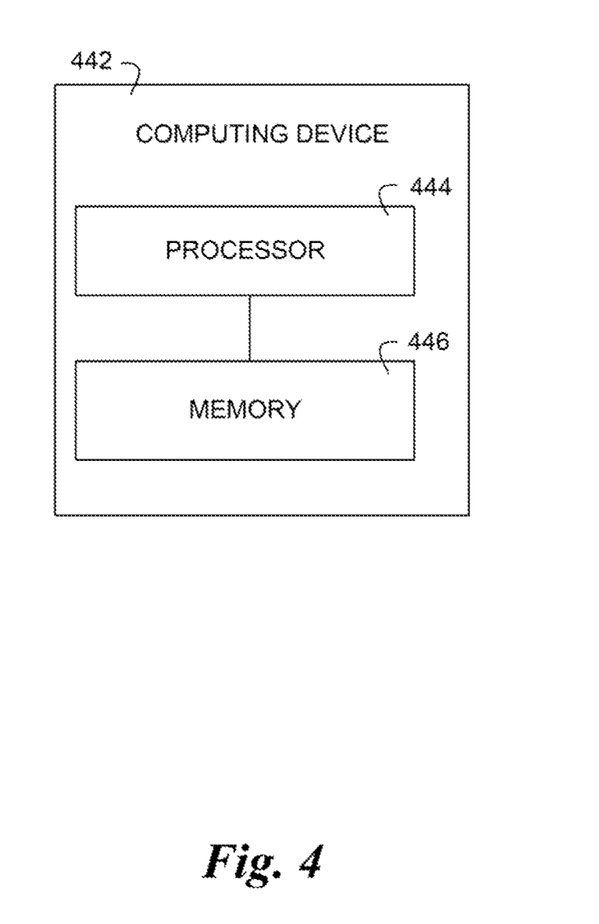
FIG. 4 illustrates a computing device for noise cancellation for voice activation according to one or more embodiments of the present disclosure.

FIG. 4 illustrates a computing device, as discussed in relation to FIGS. 1, 2, and 3, for noise cancellation for voice activation according to one or more embodiments of the present disclosure. The computing device 442 can be, for example, a laptop computer, a desktop computer, a thermostat, or a mobile device (e.g., a mobile phone, a personal digital assistant, etc.), among other types of computing devices.

As shown in FIG. 4, computing device 442 includes a processor 444 and a memory 446 coupled to the processor 444. Memory 446 can be any type of storage medium that can be accessed by the processor 444 to perform various examples of the present disclosure. For example, memory 446 can be a non-transitory computer readable medium having computer readable instructions (e.g., computer program instructions) stored thereon that are executable by the processor 444 for noise cancellation for voice activation according to one or more embodiments of the present disclosure.

Memory 446 can be volatile or nonvolatile memory. Memory 446 can also be removable (e.g., portable) memory, or non-removable (e.g., internal) memory. For example, memory 446 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 446 and processor 444 are illustrated as being located in computing device 442, embodiments of the present disclosure are not so limited. For example, memory 446 and processor 444 can also be located internal to another computing resource (e.g., enabling computer readable instructions to be downloaded over the Internet or another wired or wireless connection).

Computing device 442 can include a user interface. The user interface can be a graphic user interface (GUI) that can provide (e.g., display and/or present) and/or receive information (e.g., data and/or images) to and/or from a user (e.g., operator) of computing device 442. For example, the user interface can include a screen that can provide information to a user of computing device 442 and/or receive information entered into a display on the screen by the user. However, embodiments of the present disclosure are not limited to a particular type of user interface.

Processor 444 can execute the executable instructions stored in the memory 446 in accordance with one or more embodiments of the present disclosure. For example, processor 444 can execute the executable instructions stored in memory 446 to determine, with the computing device 442, whether a background noise received by the computing device 442 from an environment proximate to the computing device 442 is recognized. For instance, the background noise can be generated by a piece of equipment and/or appliance located in the environment proximate to the computing device 442.

Processor 444 can execute the executable instructions stored in the memory 446 to create a stored noise cancellation filter based on the background noise when the background noise is not recognized. In an example, the stored noise cancellation filter can include identification characteristics associated with the background noise, as discussed herein.

Processor 444 can execute the executable instructions stored in the memory 446 to upload the stored noise cancellation filter to a second computing device for filtering out background noise associated with the stored noise cancellation filter at the second computing device. As discussed herein, by uploading the stored noise cancellation filter to the second computing device, the second computing device may not need to enter a training mode to learn the stored noise cancellation filter.

In an example, the computing device 442 can upload the stored noise cancellation filter to a server. For instance, the stored noise cancellation filer can be uploaded to the server and the server can distribute the stored noise cancellation filter to the second computing device.

In an example, the stored noise cancellation filters can be stored as a group of noise cancellation filters based on a type of environment that the noise cancellation filters were created. For instance, if the stored noise cancellation filters were created in a home environment and/or work environment, the filters can be stored with a tag indicating such. In an example, the stored group of noise cancellation filters can be distributed to the second computing device.

Processor 444 can execute the executable instructions stored in the memory 446 to receive a second background noise and a voice command at the second computing device. In an example, the second computing device can receive the second background noise from a second environment. The second environment can be proximate to the second computing device. Alternatively, and/or in addition, the second environment can be different than the environment proximate to the computing device 442.

Processor 444 can execute the executable instructions stored in the memory 446 to filter out the second background noise with the stored noise cancellation filter at the second computing device. In an example, the second background noise can be associated with the stored noise cancellation filter. As such, the second computing device can recognize the second background noise and filter out the second background noise from a signal that includes the second background noise and the voice command.

In an example, processor 444 can execute the executable instructions stored in the memory 446 to combine a plurality of stored noise cancellation filters. As discussed herein, the stored noise cancellation filers can be combined to form an adaptive filter. In an example, the second background noise can be filtered out with the combined plurality of stored noise cancellation filters.

Processor 444 can execute the executable instructions stored in the memory 446 to recognize the voice command. In an example, after the second background noise has been filtered from the signal that includes the second background noise and the voice command, a voice recognition process can be performed on the voice command to convert the voice command into a computing device command. The computing device command can then instruct the computing device 442 to perform a particular function.

In an example, the voice recognition process can be performed at the server. As discussed herein, processing resources used for filtering out the background noise and/or performing voice recognition on the voice command can generate heat. In an example where the computing device 442 is a thermostat, the generated heat can affect performance of the thermostat, as discussed herein. As such, the voice recognition process can be performed on the voice command at the server to avoid heat generation at the thermostat.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for noise cancellation for voice activation, comprising:
   determining, with a computing device, whether a background noise received with the computing device is recognized;
   creating a new stored noise cancellation filter based on the background noise when the background noise is not recognized;
   receiving a signal that includes the background noise and a voice command at the computing device;
   filtering out the background noise from the signal with the new stored noise cancellation filter;
   processing the filtered signal at the computing device with a voice recognition engine;
   determining a confidence level associated with the filtered signal;
   applying a second stored noise cancellation filter to the filtered signal to filter out the background noise when the filtered signal does not meet a threshold confidence level; and
   applying additional stored noise cancellation filters to the filtered signal to filter out the background noise until at least one of a defined time limit is exceeded and the processed signal meets the threshold confidence level.

2. The method of claim 1, wherein the method includes:
   entering a sleep mode with the computing device upon a period of inactivity; and
   receiving the background noise when the computing device is in the sleep mode.

3. The method of claim 2, wherein creating the stored noise cancellation filter based on the background noise when the background noise is not recognized includes creating the stored noise cancellation filter while the computing device is in the sleep mode.

4. The method of claim 1, wherein the method includes receiving a pre-existing stored noise cancellation filter with the computing device.

5. The method of claim 4, wherein the method includes filtering out the background noise with the pre-existing stored noise cancellation filter.

6. The method of claim 1, wherein the method includes uploading the new stored noise cancellation filter to a server and distributing the new stored noise cancellation filter to a second computing device for filtering out the background noise associated with the new stored noise cancellation filter.

7. The method of claim 6, wherein the method includes grouping a plurality of noise cancellation filters stored on the server based on a type of environment in which they were created; and download the grouped plurality of noise cancellation filters with the second computing device upon an installation of the second computing device.

8. The method of claim 1, wherein determining whether the background noise is recognized includes determining whether a correlation exists between the background noise and at least one of a plurality of stored noise cancellation filters.

9. The method of claim 1, wherein the method includes:
sending the background noise to a second computing device;
determining, with the second computing device, whether a correlation exists between the background noise and one of a plurality of stored noise cancellation filters.

10. The method of claim 1, wherein the method includes:
applying a plurality of stored noise cancellation filters to the background noise and the voice command to filter out the background noise based on a correlation between the background noise and the plurality of stored noise cancellation filters, wherein the plurality of stored noise cancellation filters have an overall first weight;
modifying the overall first weight associated with the plurality of stored noise cancellation filters if the determined confidence level does not meet the threshold confidence level; and
applying a plurality of stored noise cancellation filters with an overall second weight to the background noise and the voice command to filter out the background noise in response to the confidence level not meeting the threshold confidence level.

11. A machine-readable non-transitory medium storing instructions for noise cancellation for voice activation, executable by a machine to cause the machine to:
determine, with a computing device, whether a first background noise received by the computing device from an environment proximate to the computing device is recognized;
create a first stored noise cancellation filter based on the first background noise when the first background noise is not recognized;
upload the first stored noise cancellation filter to a second computing device for filtering out background noise associated with the first stored noise cancellation filter;
receive a second background noise and a voice command at the second computing device;
process the second background noise and the voice command at the second computing device with a voice recognition engine;
determine a confidence level associated with a processed signal that includes the second background noise and the voice command;
filter out the second background noise with the first stored noise cancellation filter at the second computing device when the processed signal does not meet the confidence level; and
process the filtered signal with the voice recognition engine;
determine a second confidence level upon processing the filtered signal with the voice recognition engine;
determine whether the processed filtered signal meets the confidence level; and
reprocess the filtered signal with a different noise cancellation filter until the processed filtered signal meets the confidence level.

12. The medium of claim 11, wherein the second computing device receives the second background noise from a second environment, wherein the second environment is proximate to the second computing device.

13. The medium of claim 11, further comprising instructions executable to upload the first stored noise cancellation filter to a server, wherein the server distributes the first stored noise cancellation filter to the second computing device.

14. The medium of claim 13, further comprising instructions executable to distribute a group of stored noise cancellation filters to the second computing device, wherein the group of stored noise cancellation filters is formed based on a type of environment that the noise cancellation filters were created.

15. The medium of claim 11, further comprising instructions executable to:
combine a plurality of stored noise cancellation filters; and
filter out the second background noise with the combined plurality of stored noise cancellation filters.

16. A system for noise cancellation for voice activation, the system comprising:
a processor;
a memory having instructions stored thereon which when executed by the processor cause the processor to:
determine, with a first computing device, whether a first background noise received by the first computing device is recognized;
create a first stored noise cancellation filter based on the first background noise when the first background noise is not recognized;
receive a second background noise and a voice command at the first computing device;
process the second background noise and the voice command at the first computing device with a voice recognition engine;
determine a confidence level associated with a processed signal that includes the second background noise and the voice command;
apply the first stored noise cancellation filter to the signal to filter out the second background noise when the processed signal does not meet the confidence level;
process the filtered signal with the voice recognition engine;
determine a second confidence level upon processing the filtered signal with the voice recognition engine;
determine whether the processed filtered signal meets the confidence level; and
reprocess the filtered signal with a different noise cancellation filter until the processed filtered signal meets the confidence level.

17. The system of claim 16, wherein a second stored noise cancellation filter is generated at a second computing device and downloaded by the first computing device from the second computing device in response to a selection received by the first computing device.

18. The system of claim 16, wherein a second stored noise cancellation filter is downloaded by the first computing device from a server in communication with the first computing device and a second computing device where the second stored noise cancellation filter is generated.

* * * * *